Figure 1:
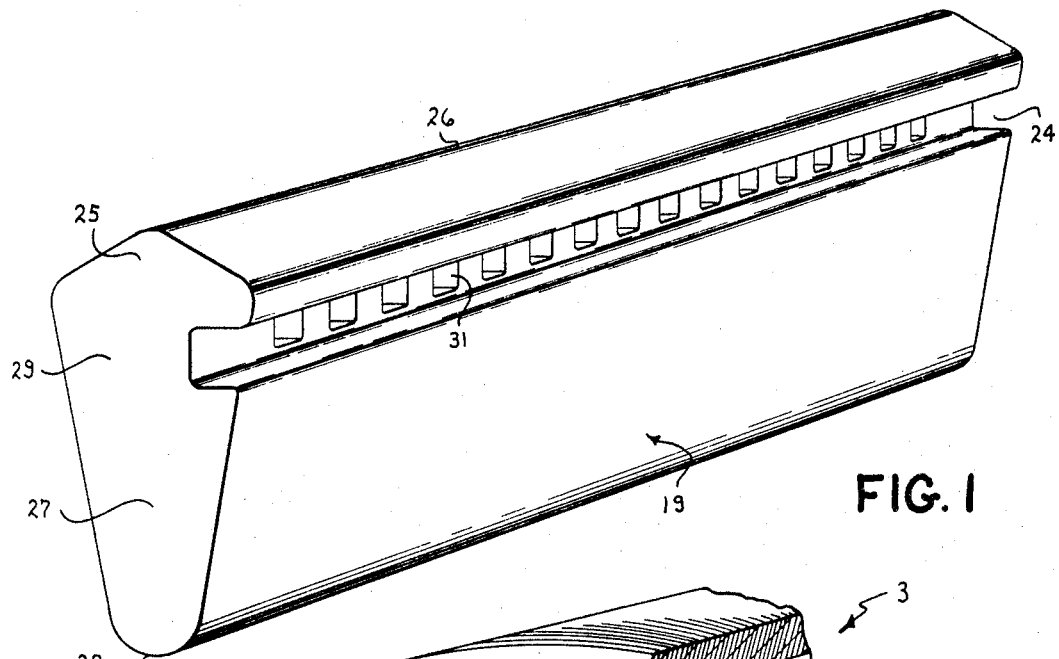

Sept. 10, 1968   D. F. LACKEY   3,401,291
BAR DESIGN FOR HIGH TORQUE, LOW SLIP SQUIRREL CAGE ROTORS
Filed Jan. 26, 1966

INVENTOR.
DALE F. LACKEY
BY James C. Davis Jr.
HIS ATTORNEY

United States Patent Office 3,401,291
Patented Sept. 10, 1968

3,401,291
BAR DESIGN FOR HIGH TORQUE, LOW SLIP SQUIRREL CAGE ROTORS
Dale F. Lackey, Ballston Lake, N.Y., assignor to General Electric Company, a corporation of New York
Filed Jan. 26, 1966, Ser. No. 523,115
4 Claims. (Cl. 310—212)

The present invention relates to induction motors and, more specifically, to an improved rotor for a squirrel cage induction motor.

Generally, induction motors consist of a laminated stator having a plurality of slots on its inner circumference in which are disposed stator windings. The rotor is also laminated and adjacent its outer peripheral surface are a plurality of slots in which are received rotor windings. In the case of squirrel cage rotors, the rotor windings consist of bare conductors of aluminum, or other suitable material, which are disposed in the rotor slots and short-circuited at each end thereof by end rings. Voltage is applied to the stator winding and a voltage is induced in the rotor via the motor air gap.

In constructing a rotor for an induction motor, and in particular a squirrel cage rotor, it is found that rotors having a constant resistance have a basic limitation in that the rotor design is generally a compromise between a high efficiency construction and a high-starting torque construction. This is due to the fact that for high efficiency, the rotor resistance must be kept relatively low but for high-starting torques, the rotor resistance should be relatively high.

Heretofore, in order to solve this problem, squirrel cage rotors have been of the double-cage variety. In this construction, the rotor comprises two sets of radially spaced cages. The outer cage, due to its being disposed near the peripheral surface of the laminated rotor, has a relatively low inductance whereas the inner cage, due to its being deeply embedded in the rotor, has a relatively high inductance. In order to provide the desired current path, the inner cage resistance is made much smaller than the outer cage resistance. This is generally accomplished by properly dimensioning the relative cross-sectional areas thereof or by utilizing different materials for each cage.

At standstill, the frequency of the voltage induced in the rotor is approximately equal to that of the supply voltage. Because of this and the fact that the inductance of the inner cage is higher than that of the outer cage, the inductive reactance of the inner cage is high and the impedance of the inner cage is greater than the impedance of the outer cage. Thus, during start of the motor, the current flowing in the rotor flows in the high resistance outer cage and, consequently, a high-starting torque is obtained. When the motor reaches running speed, the frequency of the voltage induced in the rotor is relatively low, on the order of a few cycles per second, or less, and, consequently, the inductive reactance of the inner cage is very low. Because the inner cage has a relatively low resistance, the impedance of the inner cage is less than the outer cage, which is of a high resistance, and the current flowing in the rotor flows mostly in the low resistance inner cage, thus resulting in high efficiency operation of the motor.

However, these constructions have generally required that two separate cages be constructed and in some instances one cage has even been constructed of a material different from that of the second cage. Consequently, complicated manufacturing procedures were needed to assemble the motors. Further, heat generated in the rotor due to losses at standstill presented a cooling problem as it was not readily dissipated by the rotor punchings.

Therefore, one object of the present invention is to provide an improved induction motor.

Another object of the present invention is to provide a squirrel cage induction motor having a high-starting torque and a low slip.

Still another object of the present invention is to provide a rotor for a squirrel cage motor having high reliability, low cost, and increased thermal capacity.

Briefly, in the present invention, there is included in an induction motor a laminated rotor having appropriate slots therein in which are received single-bar windings. The bar windings are short-circuited at each end thereof by suitable end rings. The bar windings have disposed between their radially inner and outer edges means which electrically separate each bar into an outer portion of high resistance and an inner portion of relatively lower resistance. In the preferred embodiment this means comprises a plurality of longitudinally disposed apertures in each bar. By utilizing such construction, the rotor has high reliability due to its integral construction, has a large thermal capacity due to its ability to conduct heat from the outer cage, and is relatively inexpensive to assemble.

Figure 2:
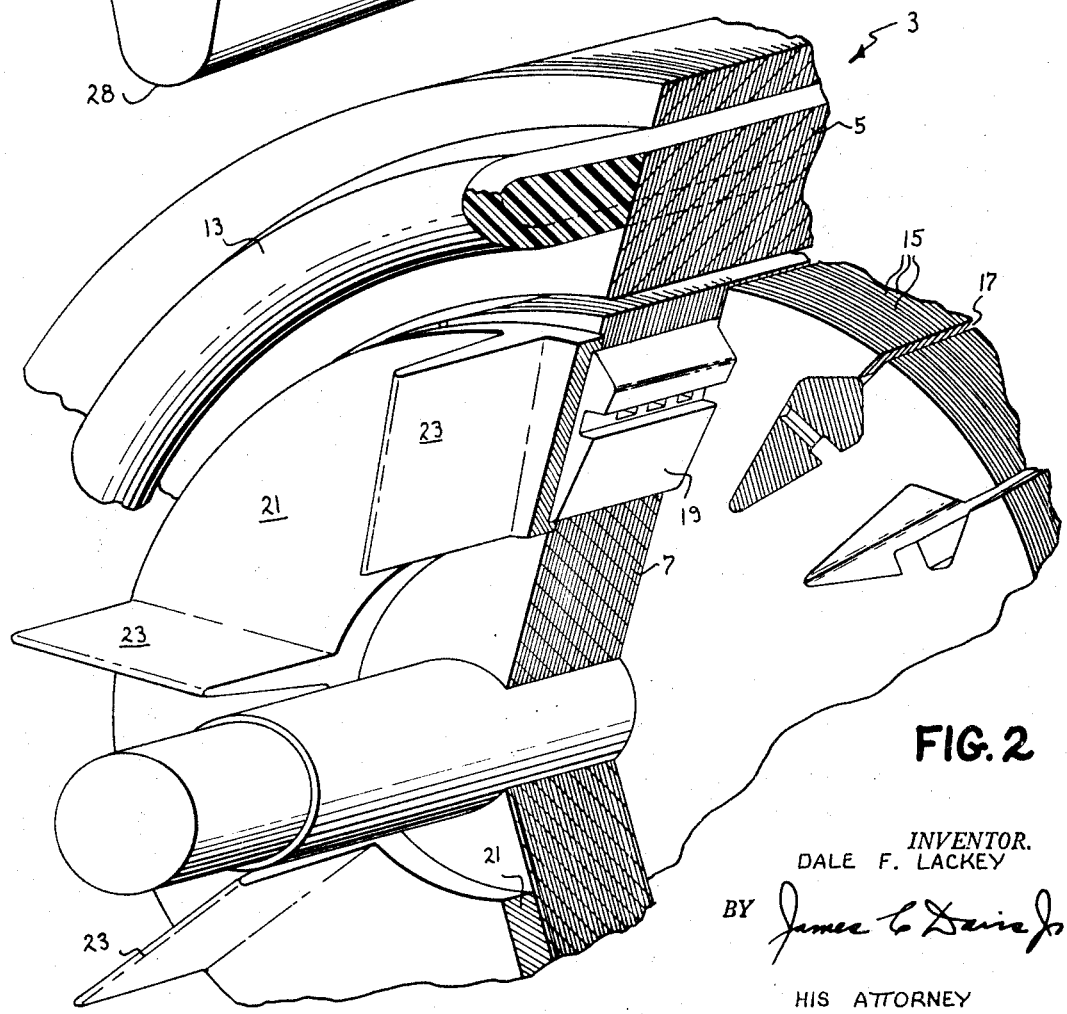

Additional objects and advantages of the present invention, together with a better understanding thereof, may be had by referring to the following detailed description of the present invention, together with accompanying drawings:

FIGURE 1 reveals a view of a rotor bar constructed in accordance with the principles of the present invention; and FIGURE 2 reveals a cross-section perspective view of a squirrel cage induction motor in which is incorporated the fabricated rotor bar of FIGURE 1.

Referring now to FIGURES 1 and 2 of the drawings, there is shown a typical squirrel cage induction motor 3 comprising a stator 5 and a rotor 7. Both the stator 5 and rotor 7 are of a suitable laminated construction. Disposed within slots (not shown) on the stator 5 are primary windings 13 which are energized from an external source of voltage (not shown). The rotor 7 comprises a plurality of magnetic punchings 15 each having a plurality of slots 17 which, when the magnetic punchings 15 are assembled, align to permit passage of a rotor winding therethrough. Generally, the rotor slots 17 are skewed a slight degree so as to provide hum-free operation of the motor.

The rotor windings comprise bars 19 of conductive material placed within the rotor slots 17 and short-circuited at each end thereof by end rings 21 that are welded or otherwise suitably mechanically and electrically connected thereto. Fan blades 23 may be utilized for cooling the rotor 7 in a well-known manner.

As can best be seen in the FIGURE 1 and in order to provide a rotor for a squirrel cage induction motor utilizing only single rotor bars to produce a double-cage effect, each conductor bar 19 is generally oval in shape and has a longitudinal slot 24 cut or otherwise formed in one lateral edge thereof. Thus, each conductor bar 19 comprises a radially outer section 25 having an outer edge 26, a radially inner section 27 having an inner edge 28, and a median portion 29 connecting the two. So that a high-torque, low-slip motor is obtained, the slot 24 is so located that the cross-sectional area of the radially outer section 25 is relatively smaller than that of the radially inner section 27. This causes the resistance of the outer section 25 to be relatively greater than that of the inner section 27. To electrically divide each conductor bar 19 so as to form an outer cage and an inner cage and thus provide a double-cage characteristic, a plurality of longitudinally disposed apertures 31 are cut, punched, drilled or otherwise formed in the median portion 29 of each conductor bar 19. In the preferred embodiment shown in FIGS. 1-2, the slot 24 is located nearer the radially outer edge 26 than the radially inner edge 28 to insure that the outer cage has a higher resistance than the inner cage.

Thus, at standstill, when voltage is initially applied to the stator windings 13, a voltage is induced in the rotor bars 19 and the current which flows as a result thereof has a frequency approximately equal to that of the supply voltage. As the impedance of the radially inner section 27 is much greater than the impedance of the radially outer section 25, the current initially flowing in the rotor flows principally in the radially outer section 25.

As the motor accelerates toward its running speed, which in fact is at some speed less than the synchronous speed of the motor, the frequency of the voltage induced in the rotor bars 19 is only a fraction of the frequency of the source voltage. Thus, as previously discussed, the impedance of the radially inner section 27 of the rotor bars 19 is greatly diminished and in fact becomes less than that of the radially outer section 25 so that the current principally follows the path of the lower impedance and now flows in the radially inner section 27 of the rotor bars 19.

Therefore, it can be seen that a rotor constructed in accordance with the principles of the present invention utilizes only a single rotor bar which has the electrical characteristics approximating those of a double-cage rotor, but retaining the mechanical strength of an integral assembly. Additionally, by utilizing such a construction, the heat losses generated in the rotor due to the high current flowing at standstill are quickly conducted away from the outer section 25 and through the neck portion 29 to the inner section 27 by the aluminum or other suitable material of low electrical and thermal resistivity. This enables the heat to be readily dissipated in the rotor punchings and prevents overheating of the motor during the starting thereof.

While I have shown and described only a particular embodiment of the present invention, it will be obvious to those skilled in the art that various changes and modifications may be made without departing from the present invention in its broader aspects, and therefore it is the intention of the appended claims to cover all such changes and modifications as fall within the true spirit and scope of the present invention.

What I claim as new and desire to secure by Letters Patent of the United States is:

1. In a squirrel cage induction motor, a rotor having a plurality of slots therein, a conductor disposed in each of said slots, each of said conductors having a plurality of apertures therein, said apertures being disposed longitudinally along each of said conductors, and means at each end of said rotor for electrically interconnecting said conductors.

2. A rotor as described in claim 1 wherein the cross-sectional area of the portion of each of said conductors between said plurality of longitudinally disposed apertures and the radial outer edge of said conductors is less than the cross-sectional area of each of said conductors between said plurality of longitudinally disposed apertures and the radial inner edge of said conductors.

3. A rotor as described in claim 1 wherein said plurality of longitudinally disposed apertures are located nearer the radial outer edge of said conductors than the radial inner edge thereof.

4. A squirrel cage induction motor comprising a stator, a rotor, said rotor having a plurality of slots therein, a single conductor bar disposed in each of said slots, a longitudinal groove cut in a lateral edge of each of said conductor bars to divide each of said conductor bars into a radial outer portion, a radial inner portion, and a median portion, said radial outer portion having a smaller cross-section than said radial inner portion, a plurality of apertures in each of said conductor bars, said plurality of apertures being disposed longitudinally along said median portion of each of said conductor bars, and means at each end of said rotor for electrically interconnecting said bar windings.

References Cited

UNITED STATES PATENTS

| 1,986,368 | 1/1935 | Schwarz | 310—212 |
| 2,242,007 | 5/1941 | Leader | 310—212 |
| 2,794,138 | 5/1957 | Dunn | 310—211 |
| 3,027,474 | 3/1962 | Rosenberry | 310—211 |

MILTON O. HIRSHFIELD, *Primary Examiner.*

W. E. RAY, *Assistant Examiner.*